United States Patent [19]

Sanai et al.

[11] Patent Number: 5,029,045
[45] Date of Patent: * Jul. 2, 1991

[54] SURFACE LIGHTING APPARATUS

[75] Inventors: Yukiharu Sanai; Yuu Hirano, both of Sanda, Japan

[73] Assignee: Mitsubishi Denki Kabushiki Kaisha, Tokyo, Japan

[*] Notice: The portion of the term of this patent subsequent to Jun. 12, 2007 has been disclaimed.

[21] Appl. No.: 389,803

[22] Filed: Aug. 4, 1989

[30] Foreign Application Priority Data

Aug. 6, 1988 [JP] Japan ................... 63-196889

[51] Int. Cl.⁵ .......................................... G01D 11/28
[52] U.S. Cl. ........................................ 362/26; 362/31; 362/245; 350/345
[58] Field of Search ............... 362/26, 27, 31, 245, 362/246, 32, 346, 296, 297; 350/345

[56] References Cited

U.S. PATENT DOCUMENTS

| | | | |
|---|---|---|---|
| 3,040,168 | 6/1962 | Stearns | 362/27 |
| 3,349,234 | 10/1967 | Schwarz | 362/26 |
| 3,729,626 | 4/1973 | Thurlow et al. | 362/31 |
| 4,460,939 | 7/1984 | Murakami et al. | 362/31 |
| 4,487,481 | 12/1984 | Suzawa | 350/345 |
| 4,630,895 | 12/1986 | Abdala, Jr. et al. | 362/31 |
| 4,648,690 | 3/1987 | Ohe | 362/31 |
| 4,714,983 | 12/1987 | Lang | 362/27 |
| 4,729,185 | 3/1988 | Baba | 362/31 |
| 4,933,814 | 6/1990 | Sanai | 350/345 |

FOREIGN PATENT DOCUMENTS 60-140086 9/1985 Japan.
62-69281 4/1987 Japan.

Primary Examiner—Ira S. Lazarus
Assistant Examiner—D. M. Cox
Attorney, Agent, or Firm—Burns, Doane, Swecker & Mathis

[57] ABSTRACT

A surface lighting apparatus for backlighting a liquid crystal display panel(LCD) (4) has a light guide (11) for evenly illuminating back face of the LCD, the light guide comprising: an incidence plane wherefrom light beams from light source come in; a front face disposed vertical to the incidence plane wherefrom the light beams are out; and a curved back face whereon light reflecting layer is formed for reflecting the light beams to the front face.

5 Claims, 5 Drawing Sheets

SURFACE LIGHTING APPARATUS

BACKGROUND OF THE INVENTION

1. Field of the Invention

The present invention relates to a surface lighting apparatus suitable for use for backlighting of a liquid crystal display panel.

2. Description of the Prior Art

A conventional surface lighting apparatus, for example, shown in Japanese Unexamined Utility Model Publication Sho No. 62-69281 is described referring to FIGS. 9 and 10. FIG. 9 is a perspective view showing the conventional surface lighting apparatus and a liquid crystal display panel. FIG. 10 shows the luminance distribution of light in the conventional surface lighting apparatus.

In FIG. 9, the conventional surface lighting apparatus comprises: a light guide 3; incandescent lamps 7a, 7a, 7b and 7b which are provided in the vicinity of end faces 3a, 3a of the light guide 3; and a reflection frame 4 for enclosing the incandescent lamps 7a, 7a, 7b and 7b and the light guide 3. In front of the light guide 3, a liquid crystal display panel 1 is disposed.

Light beams irradiated from the incandescent lamps 7a, 7a, 7b and 7b come into the light guide 3 and are diffusively reflected in the light guide 3 by a diffusive reflection layer 5 formed on back face of the light guide 3. The reflected light beams are irradiated from the front face 3b of the light guide 3. Thereby, the liquid crystal display panel (LCD) 1 is backlighted.

In the above-mentioned conventional surface lighting apparatus, the incandescent lamp 7a is disposed, for example, as shown in FIG. 10, wherein lengthwise direction of a filament thereof is parallel to a side face 3a of the light guide 3. In such a case, luminance distribution of the incandescent lamp 7a is shown by dotted line A in FIG. 10 (on the dotted line A, intensity of the light is even). In the vicinity of the side face 3a of the light guide 3 to the incandescent lamp 7a, quantity of incidence light is large. In the distant part from the incandescent lamp 7a, quantity of incidence light is small. As a result, distribution of the incidence light becomes as shown by dotted line B in FIG. 10 (on the dotted line B, intensity of the light is even). Namely, irradiaton of the light in the vicinity of the light guide 3 to the incandescent lamp 7a is strong and that in the distance is weak. Therefore, surface lighting becomes uneven. Furthermore, in the lengthwise direction of the conventional light guide 3, intensity of the light becomes weak responding to increase of the distance from the light source, so that illuminance as a whole of the light guide 3 becomes uneven.

SUMMARY OF THE INVENTION

Object of the present invention is to provide an improved surface lighting apparatus having even luminance distribution as a whole of a light guide.

A surface lighting apparatus in accordance with the present invention comprises:

at least one light source having uneven luminance distribution;

reflection means disposed in the vicinity of the light source for reflecting light beams irradiated from the light source to predetermined directions;

a light guiding means having a incidence plane disposed for facing to a region wherein intensity of the luminance distribution of the light source is most weak, a front face and a back face thereof gradually curved to be thin corresponding to distance from the incidence plane; and diffused reflection means formed on the back face for diffusively reflecting light beams propagated from the incidence plane to the front face.

In the above-mentioned surface lighting apparatus in accordance with the present invention, light beams from the light source come substantially even into the light guiding means because: first, the incidence plane of the light guiding means is disposed to face to the most weak region of luminance distribution; and second, light reflecting means for reflecting light beams irradiated from the light source to the incidence plane of the light guiding means is formed on back face of the light guiding means. Furthermore, the back face of the light guiding means is shaped such curved face that as the distance from the incidence plane incrases, the light incidence angle to the back face increases. Thereby, light beams reach the back face with even light amount up to bottom end of the light guiding means and are irradiated for illuminating the object evenly from the upper end near the light incident end to the lower end near to the bottom end.

DESCRIPTION OF THE PREFERRED EMBODIMENTS

Figure 1:
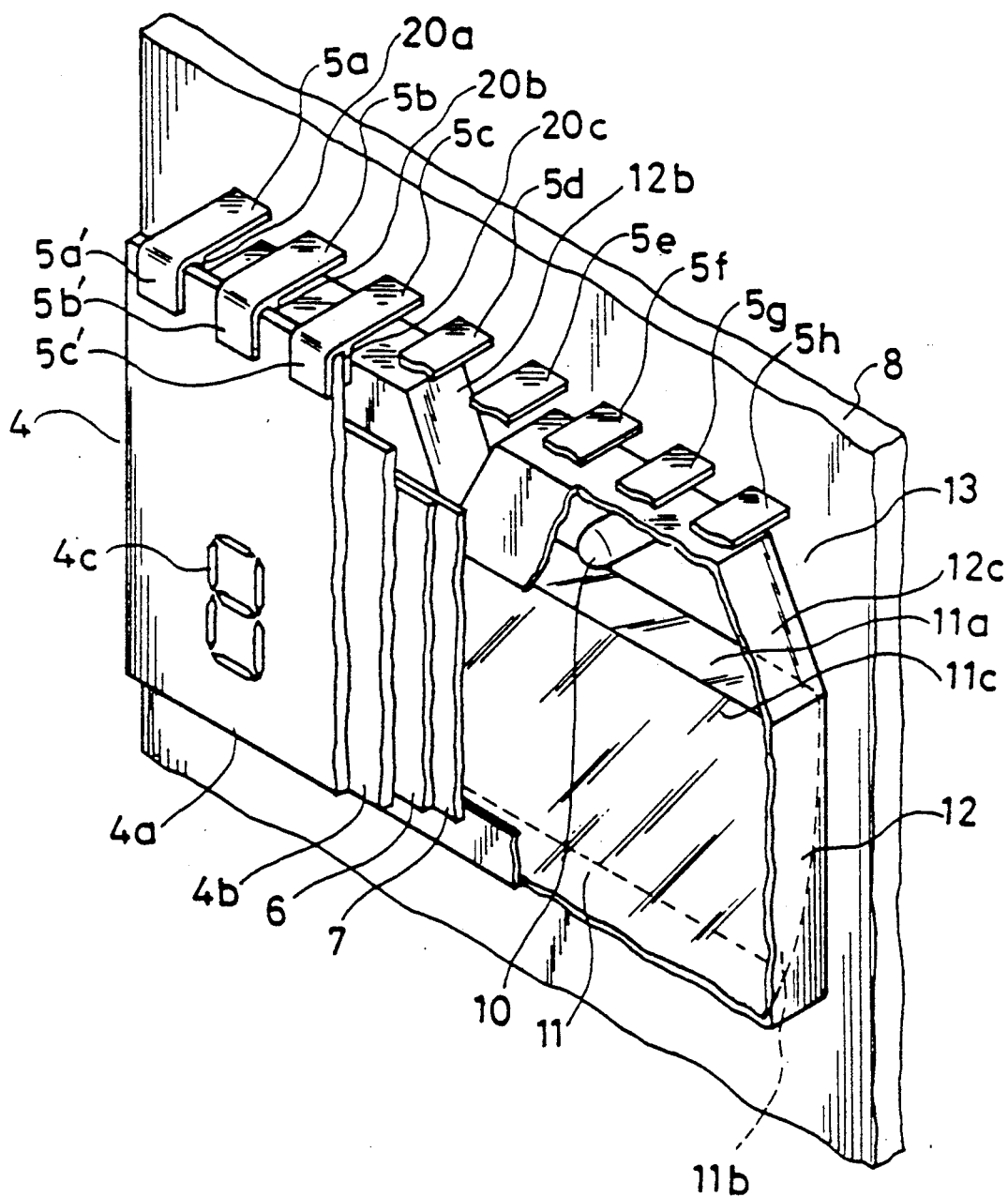
FIG. 1 is a perspective view showing an appearance of a surface lighting apparatus in accordance with the present invention.
Figure 3:
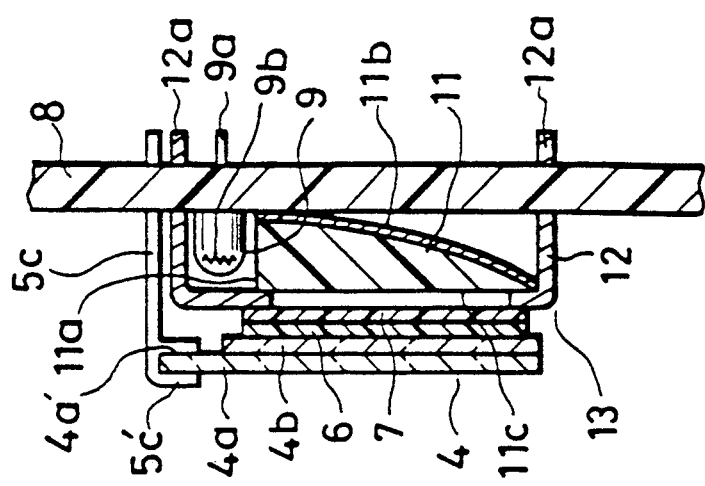
FIG. 3 is a cross-sectional side view of surface lighting apparatus in accordance with the present invention.
Figure 2:
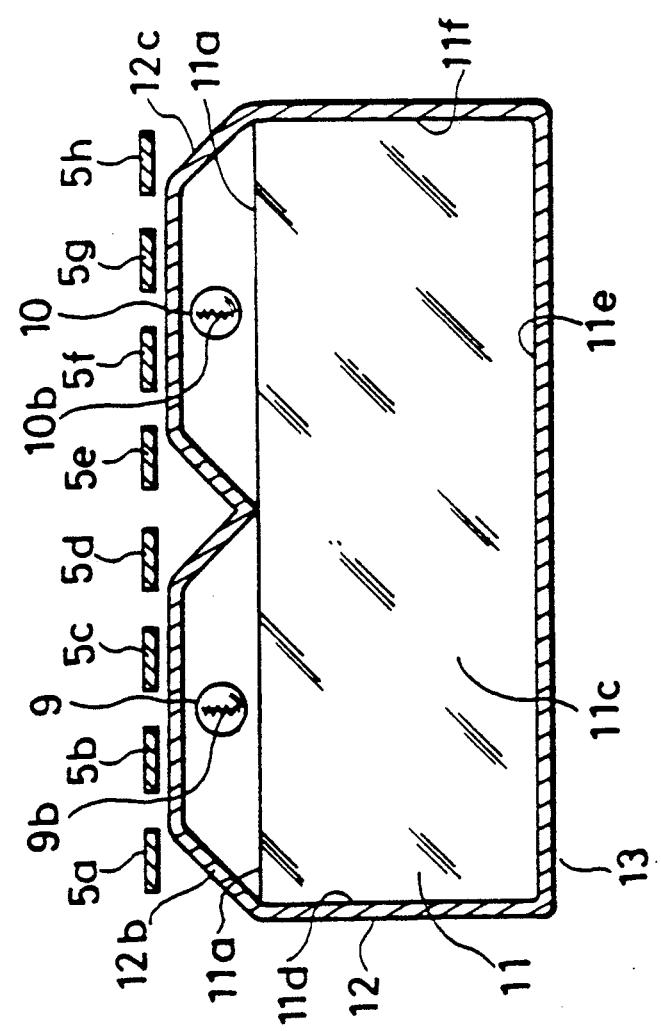
FIG. 2 is a cross-sectional plan view of the surface lighting apparatus in accordance with the present invention.
Figure 4:
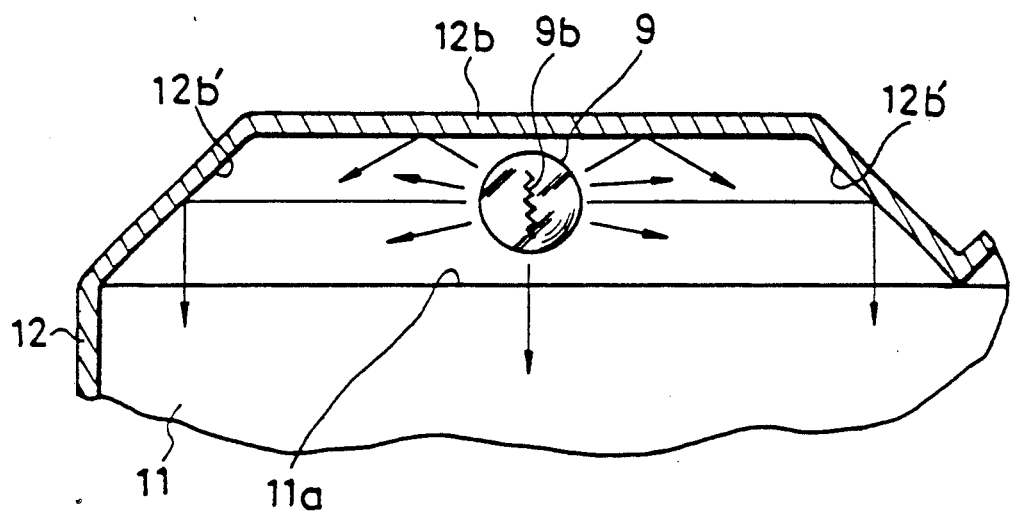
FIG. 4 is a partial and enlarged cross-sectional view showing light refleclition of the surface lighting apparatus in accordance with the present invention.

A preferred embodiment of a surface lighting apparatus in accordance with the present invention is described referring to FIGS. 1, 2, 3 and 4. FIG. 1 is a partially broken perspective view showing appearance and construction of the surface lighting apparatus. FIG. 2 is a cross-sectional plan view of the surface lighting apparatus. FIG. 3 is a cross-sectional side view of the surface lighting appartus. FIG. 4 is a partial and enlarged cross-sectional plan view of the surface lighting apparatus of FIG. 2.

In these figures, a liquid crystal display panel (LCD) comprises a first glass plate 4a, a second glass plate 4b, and liquid crystal and transparent electrodes disposed therebetween. The liquid crystal and the transparent electrodes are sandwiched between the first and the second glass plates 4a, 4b in the manner of known art. The LCD 4 indicates a predetermined display patterns such as letters, numerals or marks by operation of a known control circuit (not shown) connected to leads 5a, 5b, 5c, 5d, 5e, 5f, 5g, 5h. Terminals 20a, 20b, 20c, 20d, 20e, 20f, 20g, 20h of the transparent electrode are mounted on top part position of the rear face of the first glass plate 4a, and connected electrically to the leads 5a, 5b, 5c ..., respectively. An holders 5a', 5b', 5c', 5d', 5e', 5f', 5g', 5h' of the leads 5a, 5b, 5c ... hold the terminals 20a, 20b, 20c , ... provided on the first glass plate 4a, respectively. A transparent dimmer 6 for producing uniform quantity of light by adjusting local diffusions of light is disposed on the rear face of the second glass plate 4b. A color screen 7 for producing colored light is disposed on the rear face of the dimmer 6. The leads 5a, 5b, 5c ... connected to respective transparent electrodes are fixed on a printed substrate 8 by soldering. And, the lighting apparatus 13, a preferred embodiment of the present invention, is mounted on the printed substrate 8.

The surface lighting apparatus 13 comprises two miniature size incandescent lamps 9, 10 as light sources, and a transparent plate such as of acrylic resin is used as light guide 11. A reflecting frame 12 is disposed with its reflective inner walls closely around the light guide 11. A lead 10a of the incandescent lamp 10 is soldered to the printed substrate 8 as shown in FIG. 3, and the other incandescent lamp 9 is mounted on the substrate 8 as the above-mentioned incandescent lamp 10. The incandescent lamps 9, 10 have respective filaments 9b, 10 arranged in a vertical direction as shown in FIG. 2 and FIG. 4, such that the filaments are perpendicular to the incidence plane 11a.

Figure 6:
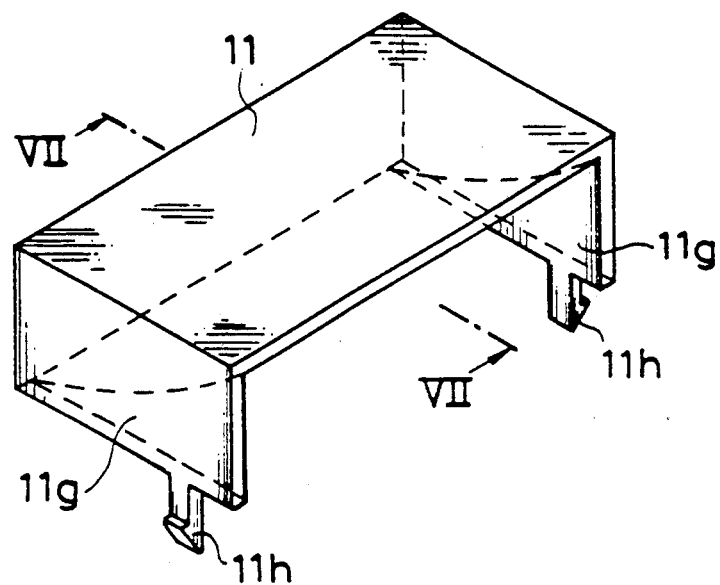
FIG. 6 is a perspective view showing a preferred embodiment of a light guide of the surface lighting apparatus in accordance with the present invention.
Figure 7:
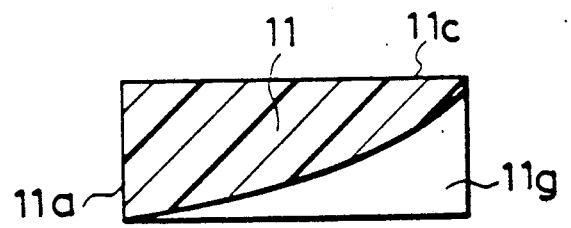
FIG. 7 is a cross-sectional side view of the light guide shown in FIG. 6.
Figure 8:
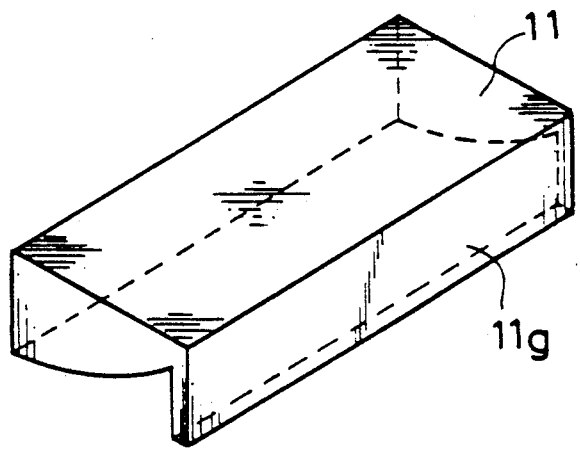
FIG. 8 is a perspective view showing another preferred embodiment of the light guide of the surface lighting apparatus in accordance with the present invention.
Figure 9:
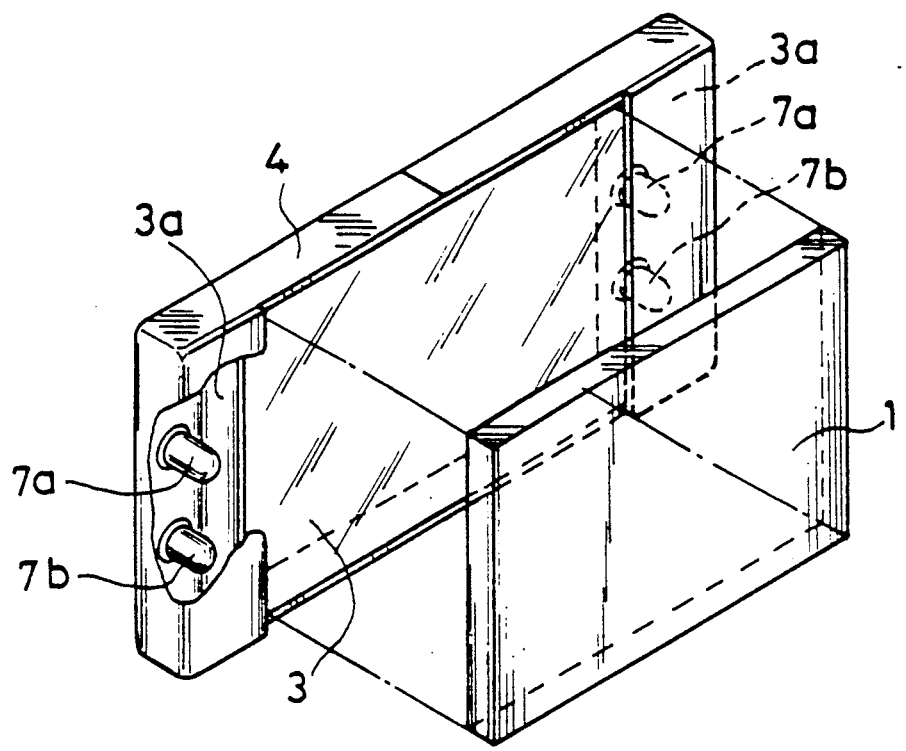
FIG. 9 is a perspective view showing a conventional surface lighting apparatus.
Figure 10:
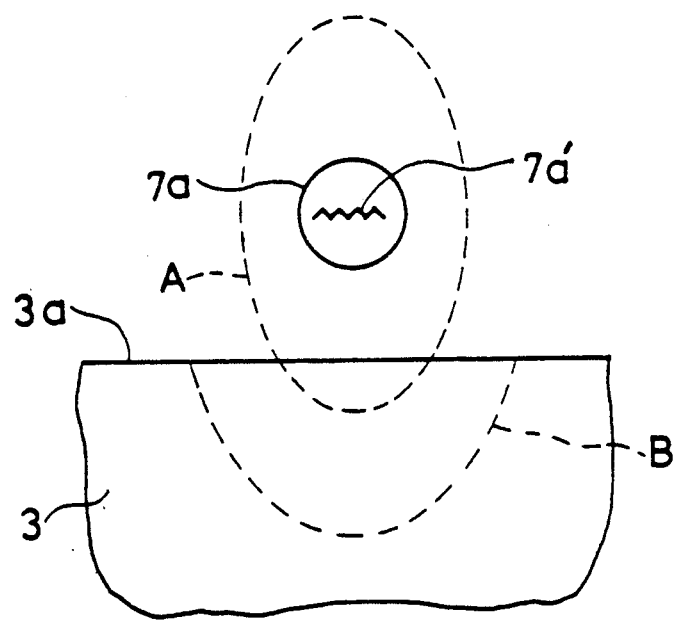
FIG. 10 is a distribution chart of the luminance of the light source of the conventional surface lighting apparatus.

In the light guide 11, back face thereof is gradually inclined for forming a curved surface wherein thickness of the light guide 11 is shaped such curved face that as the distance from the incandescent lamps 9 and 10 increases, the light incidence angle to the back face increases. A light diffusive reflective layer 11b such as a film of white paint is formed on the rear surface of the light guide 11. Light beams emitted from the incandescent lamps 9 and 10 come into the light guide 11 from an incidence plane 11a and propagate in the light guide 11. The light beams are diffusively reflected by the reflective layer 11b and irradiated from a front face 11c. The light guide 11 has ribs 11g in widthwise direction, for example, as shown in FIGS. 6 and 7 or in lengthwise direction in FIG. 8 for preventing deformation of warp of the light guide 11. Furthermore, hooks 11h are formed on the ribs 11g as shown in FIG. 6, so that the light guide 11 is firmly connected to and fixed on the printed substrate 8.

The reflecting frame 12 made of a material of good light reflection, e.g. an aluminum plate is fixed on the printed substrate 8 by soldering or bonding of projections 12a, 12a thereto. The light reflective inner wall of the reflecting frame 12 is disposed to closely surround the light guide 11. Upside ends 12b, 12c of the reflecting frame 12 are formed in a trapezoid shape like a roof to cover the incandescent lamps 9 and 10 for reflecting the light beams emitted from the incandescent lamps 9, 10, respectively.

The operation of the above-mentioned surface lighting apparatus of the present invention is elucidated hereafter.

Figure 5:
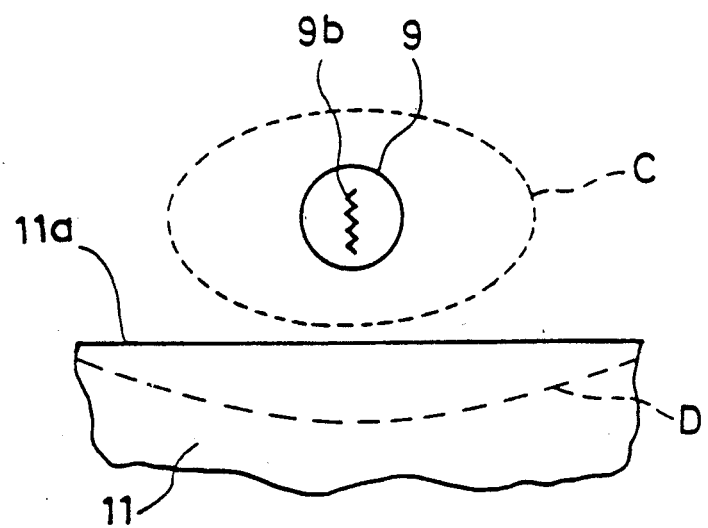
FIG. 5 is a distribution chart of the luminance of the light source of the surface lighting apparatus in accordance with the present invention.

Since the filaments 9b, 10b of the incandescent lamps 9, 10 are arranged in a vertical direction perpendicular to the incidence plane 11a as shown in FIG. 2, a luminance distribution graph of the incandescent lamps 9, 10 becomes as shown in FIG. 5. FIG. 5 is a relative illustration graph of luminance distribution of the incandescent lamp 9 or 10. An oval line C in FIG. 5 shows an equipotential curve of the luminance. Namely, luminance level of the filament 10b is the lowest in the directly lower part (i.e., in the direction of downward extension of the filament 10b), and the highest in the horizontal side (i.e., in the direction perpendicular to the direction of the extension of the filament). Thus, all the light emitted from the incandescent lamp 10 substantially enters without substantial loss. As a result, the difference of the luminance between the part at the vicinity of the incandescent lamp 10 and the part distant therefrom becomes very little. Furthermore, remaining small difference of luminance can be adjusted by making of the shape of the upper parts 12c of the frame 12 in trapezium, so as to properaly transmit the light to achieve uniform luminance over all the face of the light guide 11. For example, in this embodiment, the both sides of the upper part 12c of the frames 12 are shaped like a roof, which has oblique edges having an angle of about 45° against vertical line as shown in FIG. 4. As a result, the light beams emitted horizontally from the incandescent lamp 10 are reflected vertically downward.

Thus, quantity of the incidence light to be sent downward in the light guide 11 is almost uniform everywhere on the incidence plane 11a of the light guide 11. The light beams coming into the incidence plane 11a propagates uniformly in the light guide 11, and the light beams are reflected diffusively by the diffusive reflective layer 11b, to emit light uniformly from the front face 11c of the light guide 11. Therefore, the luminance of the front face 11c on the light guide 11 is uniform. As a result, the color screen 7 is lighted substantially uniformly by the front face 11c, and displays clearly. Further, the slightest unevenness of light is adjusted into very uniform luminance by the dimmer 6, and the LCD 4 is backlighted by the very uniform light. Accordingly, in the above-mentioned surface lighting apparatus of the present invention, the LCD 4 has uniform luminance everywhere.

Besides, since the incandescent lamps 9 and 10 are provided inside of the terminal 4a' of the LCD4 in this embodiment, the width of the surface lighting apparatus can be designed narrow by in comparison with the conventional one.

Furthermore, the first glass plate 4a connected to the leads 5a and 5h are disposed outside and the second glass plate 4b is disposed inside for facing to the light guide 11, so that the spaces between the upside frame 12b, 12c of the reflective frame 12 and the holder 5a' ... . of the leads 5a ... are wide. Thereby, short-circuit of the leads 5a to 5h via the reflective frame 12 hardly occurs even when the reflective frame 12 has conductivity.

Still more, the ribs 11g of the plate shape used in the above mentioned embodiment can be replaced by a gridshaped ribs. Further, forming of the hooks 11h on the ribs 11g can be replaced by forming the same on the reflecting frame 12 to be fixed on the printed substrate 8 and the light guide 11 is held by the reflecting frame 12.

Although the above-mentioned embodiment on assemblage has been described for backlighting the LCD 4, a surface lighting apparatus in accordance with the present invention can be applied as a backlighting for a transparent display panel of other type, or as lighting apparatus per se.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is

1. A surface lighting apparatus comprising:
    light guiding means having an incidence plane, a back face having a gradually curved shape such that as the distance from said incidence plane increases the light incident angle to said back face increases, and a front face from which light beams are irradiated;
    diffusive-reflection means formed on said back face for diffusively reflecting light beams propagated from said incidence plane to said front face;
    at least one incandescent lamp having a lamp filament disposed perpendicularly to said incidence plane in the vicinity of said incidence plane; and
    reflection means formed in a trapezoidal shape enclosing said incandescent lamp for reflecting light beams irradiated from said incandescent lamp to said incidence plane.

2. A surface lighting apparatus in accordance with claim 1, wherein
    oblique edges of said trapezoidal shape of said reflection means have an angle of about 45° against said lamp filament.

3. A surface lighting apparatus in accordance with claim 2, wherein
    said reflection means also surrounds said light guiding means.

4. A surface lighting apparatus in accordance with claim 1, 2 or 3, wherein
    said reflection means is an aluminum plate.

5. A surface lighting apparatus in accordance with claim 4, wherein
    said reflection means is fixed on a printed substrate.

* * * * *